United States Patent
Goepfert

(10) Patent No.: US 12,485,207 B2
(45) Date of Patent: Dec. 2, 2025

(54) IMPLANT WITH ANTIPROLIFERATIVE ACTIVE SUBSTANCE LIMITED TO ABLUMINAL SIDE AND METHOD OF PRODUCTION

(71) Applicant: BIOTRONIK AG, Buelach (CH)

(72) Inventor: André Goepfert, Alt Sammit (DE)

(73) Assignee: BIOTRONIK AG, Buelach (CH)

( * ) Notice: Subject to any disclaimer, the term of this patent is extended or adjusted under 35 U.S.C. 154(b) by 602 days.

(21) Appl. No.: 17/260,893

(22) PCT Filed: Aug. 14, 2019

(86) PCT No.: PCT/EP2019/071832
§ 371 (c)(1),
(2) Date: Jan. 15, 2021

(87) PCT Pub. No.: WO2020/038800
PCT Pub. Date: Feb. 27, 2020

(65) Prior Publication Data
US 2021/0252198 A1    Aug. 19, 2021

(30) Foreign Application Priority Data
Aug. 23, 2018  (EP) .................................... 18190387

(51) Int. Cl.
*A61L 31/16* (2006.01)
*A61K 31/337* (2006.01)
*A61L 31/02* (2006.01)
*A61L 31/10* (2006.01)
*C08L 67/04* (2006.01)

(52) U.S. Cl.
CPC ............ *A61L 31/16* (2013.01); *A61K 31/337* (2013.01); *A61L 31/022* (2013.01); *A61L 31/10* (2013.01); *C08L 67/04* (2013.01); *A61L 2300/416* (2013.01); *A61L 2300/608* (2013.01); *A61L 2420/02* (2013.01); *A61L 2420/08* (2013.01)

(58) Field of Classification Search
None
See application file for complete search history.

(56) References Cited

U.S. PATENT DOCUMENTS

| | | | |
|---|---|---|---|
| 8,709,071 B1 * | 4/2014 | Huang | A61L 31/148 623/1.42 |
| 10,960,110 B2 * | 3/2021 | Xie | A61L 31/148 |
| 2012/0016466 A1 | 1/2012 | Klocke et al. | |
| 2012/0158126 A1 | 6/2012 | Klocke et al. | |
| 2014/0199365 A1 | 7/2014 | Stekker et al. | |
| 2020/0038559 A1 * | 2/2020 | Zeng | A61L 29/085 |

FOREIGN PATENT DOCUMENTS

| | | |
|---|---|---|
| EP | 3120877 A1 | 1/2017 |
| WO | 2006065685 A2 | 6/2006 |
| WO | 2018050916 A1 | 3/2018 |

OTHER PUBLICATIONS

Sigma Aldrich product information sheet, accessed Aug. 29, 2023. (Year: 2023).*
European Search Report from the corresponding European Patent Application No. 18190387, dated Feb. 15, 2019.
International Search Report from the corresponding International Patent Application No. PCT/EP2019/071832, dated Oct. 25, 2019.

* cited by examiner

*Primary Examiner* — Melissa S Mercier
(74) *Attorney, Agent, or Firm* — Greer, Burns & Crain, Ltd.; Steven P. Fallon

(57) ABSTRACT

An implant, such as an endovascular implant, has degradable main body that defines a lumen. A degradable coating including at least one degradable polymer substantially completely encloses the main body on its luminal and abluminal sides. An antiproliferative active substance is upon the degradable coating only on the abluminal side of the main body.

17 Claims, 2 Drawing Sheets

IMPLANT WITH ANTIPROLIFERATIVE ACTIVE SUBSTANCE LIMITED TO ABLUMINAL SIDE AND METHOD OF PRODUCTION

PRIORITY CLAIM

This application is a 35 U.S.C. 371 US National Phase and claims priority under 35 U.S.C. § 119, 35 U.S.C. 365 (b) and all applicable statutes and treaties from prior PCT Application PCT/EP2019/071832, which was filed Aug. 14, 2019, which application claimed priority from European Application EP 18190387.3, which was filed Aug. 23, 2018.

FIELD OF THE INVENTION

The invention relates to an implant, in particular an endovascular implant, and to a method for the production thereof.

BACKGROUND

Medical implants or endoprostheses, in particular stents, are widely used to treat patients. Stents are used primarily in the case of cardiovascular diseases, in which blood vessels or hollow organs are to be held open. Depending on the intended use duration, use may be made of permanent stents, which remain in the body or have to be surgically removed, or of degradable stents, which are broken down by the body after a certain period of time.

Particularly in the case of blood vessel stents, however, there is a risk of closure. This may be caused, for example, by the formation of a thrombus, since the stent as a foreign body may encourage the blood to clot. In addition, over the course of time, a gradual overgrowth and closure may occur due to new connective tissue being formed.

To prevent the formation of new connective tissue, use is presently made of drug-eluting stents, which are coated with active substances such as antiproliferative agents, cytostatic agents, immune modulators and the like, which release the aforementioned substances into the surrounding environment.

The aforementioned degradable or bioresorbable stents, which remain in the vessel only for as long as clinically necessary, offer an advantage in avoiding the formation of thrombosis and of restenosis. The durability or rate of degradation of such degradable stents is largely dependent on the materials selected. In addition, the materials used must be well tolerated by the body and must have a certain deformability and strength. Preferred materials are in particular biocompatible metals such as magnesium, which play a role in metabolism. However, pure magnesium or magnesium alloys usually have a high rate of degradation.

Therefore, magnesium stents in particular are preferably coated with a degradable polymer in order to be able to reduce the rate of degradation or to control it more accurately. When such a stent degrades, a residue can remain. Such a residue creates a risk of forming a restenosis.

SUMMARY OF THE INVENTION

An implant, such as an endovascular implant, has degradable main body that defines a lumen. A degradable coating including at least one degradable polymer substantially completely encloses the main body on its luminal and abluminal sides. An antiproliferative active substance is upon the degradable coating only on the abluminal side of the main body . . . .

DETAILED DESCRIPTION OF THE PREFERRED EMBODIMENTS

Figure 1:
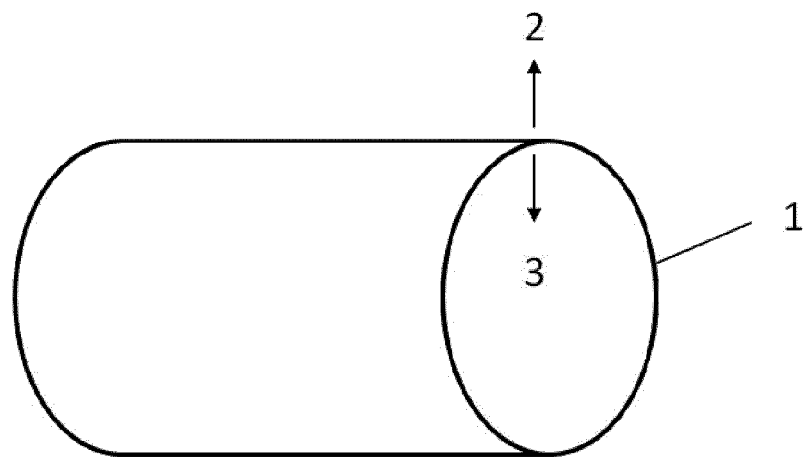
FIG. 1 is a schematic diagram of the shape of the main body of a preferred implant.

A degradable coating substantially completely encloses the degradable main body of an implant. An antiproliferative active substance is applied to the degradable coating on the abluminal side of the main body only. There is no antiproliferative active substance provided on the luminal side of the main body. Hence, according to the invention the luminal side of the main body is free of the antiproliferative active substance. Further according to the invention, the degradable coating is free of the antiproliferative active substance and further preferably free of any active substance. Hence, the degradable coating is made of a polymer matrix and the polymer matrix does not contain an active substance. The polymer matrix does contain one or more excipients which can be used to control the degradation behaviour of the degradable layer. Also, the antiproliferative active substance applied to the abluminal side of the degradable coating preferably consists only of the substance itself. Also, the antiproliferative active substance is applied without being in mixture with polymer. Hence, the antiproliferative active substance being applied to the degradable layer is polymer free. However, the antiproliferative active substance can be in mixture with an additive such as antioxidants or elution promoting excipients.

By arranging the coating in this way, it is possible to decouple the regimes of controlling the degradation and dispensing the active substance. Known stent coatings provide that the active substance is mixed into the polymer matrix. In such an arrangement, the dispensing of active substance is determined largely by the degradation of the polymer coating. In addition, the control of the degradation of the degradable scaffold of the stent is also influenced by the polymer coating due to the specific properties of the active substance in the coating. By separately applying the polymer coating and the active substance to the abluminal side, on the one hand the degradation of the scaffold of the stent can be precisely controlled by the polymer coating since the coating does not contain any dissolved active substance. On the other hand, the active substance can only be dispensed into the tissue on the abluminal side, regardless of the degradation properties of the polymer coating.

Within the meaning of the present invention, the term "substantially completely" means in particular that at least 80%, 85%, 90%, 95%, 98% or 99% of the main body is enclosed or covered by the degradable coating. Of course, the term "substantially completely" definitely includes that the entire surface of the main body is covered by the degradable coating.

Within the meaning of the invention, the term "degradable" means in particular that the components in question are gradually dissolved by chemical processes in the living organism, primarily by the body fluids coming into contact with the components, and the degradation products of the dissolved components are resorbed or excreted by the living organism.

The main body may have any design or shape, which substantially depends on the desired site of use and/or intended purpose in the body of a patient.

Preferably, the entire implant is completely degradable.

In one embodiment of the implant according to the invention, it is provided that the main body is completely enclosed by the degradable coating.

In one embodiment of the implant according to the invention, it is provided that the degradable coating includes or substantially consists of polylactic acid (CAS No. 26100-51-6), in particular poly(L-lactic acid) or polylactide-co-glycolide, or poly-ε-caprolactone.

A coating of the implant according to the invention with polylactic acid or poly(lactide-co-glycolide) is particularly advantageous in the case of particularly hydrophobic antiproliferative active substances, since in this case an abluminal application of the active substance is possible without premature delamination.

In one embodiment of the implant according to the invention, it is provided that the antiproliferative active substance is an mTOR inhibitor or a cytostatic agent. In one embodiment of the implant according to the invention, it is provided that the cytostatic agent is paclitaxel.

In one embodiment of the implant according to the invention, it is provided that the mTOR inhibitor is selected from:

sirolimus (CAS No. 53123-88-9);
everolimus (CAS No. 159351-69-6);
temsirolimus (CAS No. 162635-04-3);
ridaforolimus (CAS No. 572924-54-0);
zotarolimus; or
biolimus A9.

In one embodiment of the implant according to the invention, it is provided that the antiproliferative active substance or the mTOR inhibitor is a compound according to formula I

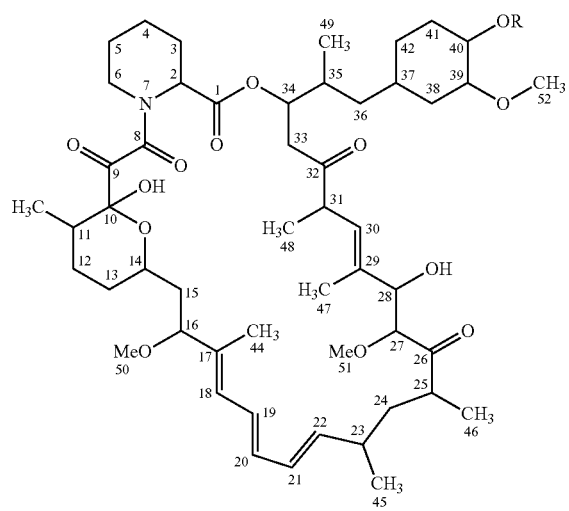

in which R is C(O)—(CH2)n-X, n is 0, 1 or 2, and X is a cyclic hydrocarbon having 3-9 carbon atoms, which optionally contains one or more unsaturated bonds.

In one embodiment of the implant according to the invention, it is provided that the compound according to formula I has the following structure:

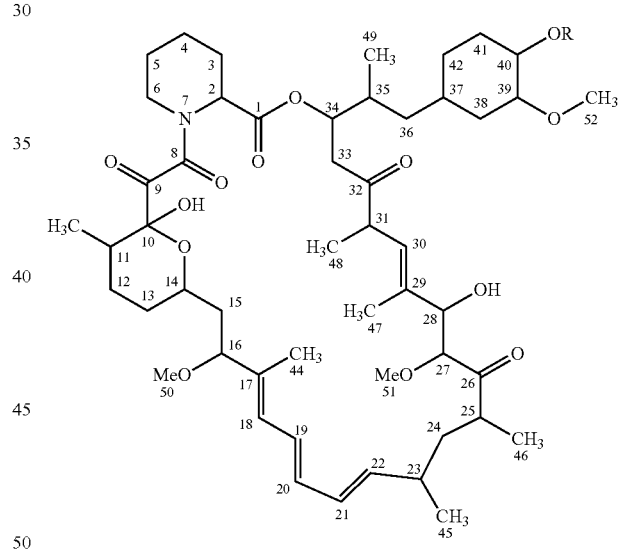

and R=C(O)—(CH2)$_n$-X has one of the following structures:

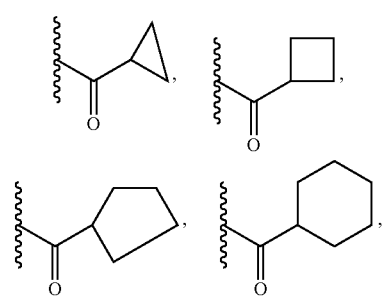

-continued

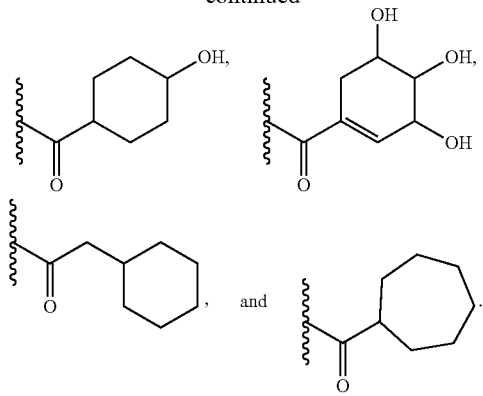

In one embodiment of the implant according to the invention, it is provided that the coating (4) can be selected to be poly(L-lactic acid) having a suitable molecular weight from the total range available, depending on the properties of the main body.

In one preferred embodiment, the coating (4) includes poly(L-lactic acid) having an inherent viscosity in the range from 0.5 dl/g to 4.0 dl/g, more preferably in the range from 0.7 dl/g to 3.8 dl/g, or the coating substantially consists of the aforementioned poly(L-lactic acids). In one embodiment, the coating (4) includes or consists of poly(L-lactic acid) having an inherent viscosity in the range from 0.9 dl/g to 3.8 dl/g. In a further embodiment, the coating (4) includes or consists of poly(L-lactic acid) having an inherent viscosity in the range from 0.7 dl/g to 1.2 dl/g.

For the implant according to the invention, it is provided that the main body is made of a degradable material, preferably a degradable metal or a degradable metal alloy. In one preferred embodiment, the metal or the metal alloy is selected from the group including or consisting of magnesium, iron and zinc or alloys thereof, in which the aforementioned metals form the largest constituents of said alloys. In one particularly preferred embodiment, the implant includes a main body which includes or substantially consists of magnesium or a degradable magnesium alloy. Advantageously, as the implant according to the invention degrades, magnesium ions are released at the site of use, which can bring about an advantageous anti-thrombotic effect at said site.

In one embodiment of the implant according to the invention, it is provided that the main body is in the form of a hollow cylindrical mesh.

In one embodiment of the implant according to the invention, it is provided that the implant is an endovascular implant. In one embodiment of the implant according to the invention, it is provided that the implant is a stent.

In one embodiment, an implant and preferably a stent is proposed, including a degradable main body made of magnesium or a magnesium alloy;

a degradable coating including or consisting of poly(L-lactic acid) having a molecular weight in the range from 0.7 dl/g to 1.2 dl/g; and an antiproliferative active substance, preferably an active substance of formula I as described herein.

In a further embodiment, an implant and preferably a stent is proposed, including a degradable main body made of iron or an iron alloy;

a degradable coating including or consisting of poly(L-lactic acid) having a molecular weight in the range from 0.9 dl/g to 3.8 dl/g; and an antiproliferative active substance, preferably an active substance of formula I as described herein.

In the above embodiments the antiproliferative active substance preferably does not contain any further additives and consists of the antiproliferative active substance itself.

A further aspect of the present invention relates to a method for producing the implant according to the invention. The method includes the steps:

providing a degradable main body;

applying a degradable coating including at least one degradable polymer substantially to the entire surface of the degradable main body; and applying an antiproliferative active substance to the degradable coating on the abluminal side of the main body.

In one embodiment of the method according to the invention, it is provided that the degradable coating and/or the antiproliferative active substance is applied by spraying, atomizing, dip-coating or pipetting.

Finally, further features and advantages of the present invention will be explained below on the basis of individual embodiments and examples of the invention.

First Example

The implant according to the invention is shown schematically in FIG. 1. In this embodiment of the invention, the implant is configured as a stent, wherein the main body 1 has the shape of a mesh-like hollow cylinder defining a lumen therein formed by a plurality of individual struts 1. The main body has a luminal side 3, that is to say a side facing towards the lumen of the vessel into which the stent is to be inserted, and an abluminal side 2, that is to say a side facing towards the vessel wall. The main body in this case consists of a degradable magnesium alloy.

Figure 2:
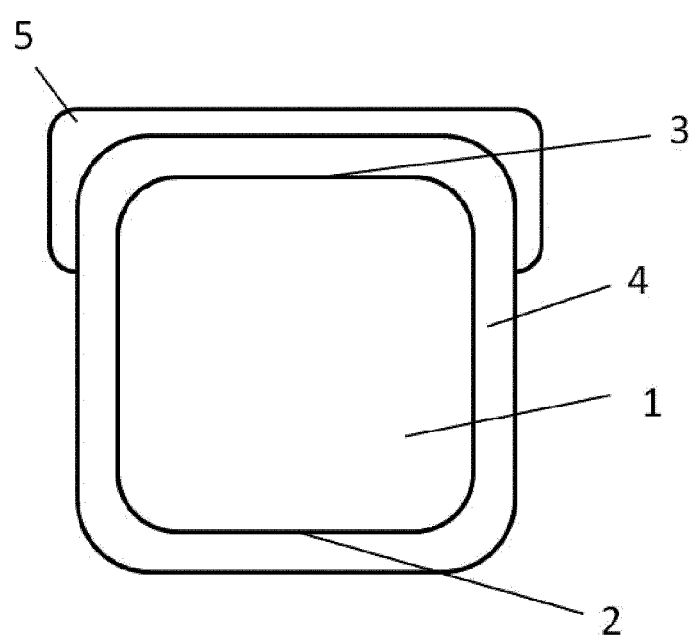
FIG. 2 illustrates a strut of the FIG. 1 implant with a degradable coating and antiproliferative active substance is applied to the degradable coating on the abluminal side of the main body only.

FIG. 2 schematically shows a strut 1 of the main body. Here, the strut 1, like the entire main body, is enclosed by a degradable coating, preferably consisting of PLLA or PLGA. This coating preferably serves as a passivation layer, which can advantageously delay the degradation of the implant since only once the coating has degraded is it possible for the main body to come into contact with the surrounding body fluids, which then cause the main body to degrade.

According to the invention, it is provided that an antiproliferative active substance 5, preferably a derivative of rapamycin, is applied to the degradable coating 4 on the abluminal side 2 of the main body 1. This application to the abluminal side enables targeted medication or targeted tissue-side dispensing of the active substance 5, which can then take effect precisely at the intended site. As a result, the healing of the stent can advantageously be accelerated. In addition, it is thus advantageously possible to shorten the duration of the dual anti-platelet therapy (DAPT).

Example 2

Particularly advantageous antiproliferative active substances are shown in the following Table 2.

TABLE 2

CRC-015 species

| Main structure | R is C(O)—(CH2)n-X with one of the following structures | Species |
|---|---|---|
| (macrocyclic main structure with numbered positions 1–52, including piperidine N, lactone, OR group, OH, MeO, CH₃ substituents) | cyclopropyl-C(O)— | CRC-015a |
| | cyclobutyl-C(O)— | CRC-015b |
| | cyclopentyl-C(O)— | CRC-015c |
| | cyclohexyl-C(O)— | CRC-015d |
| | 4-hydroxycyclohexyl-C(O)— | CRC-015e |
| | trihydroxycyclohexenyl-C(O)— | CRC-015f |
| | cyclohexylmethyl-C(O)— | CRC-015g |
| | cycloheptyl-C(O)— | CRC-015h |

Here, the term CRC-015 is intended to describe a group of compounds and refers to the individual species or compound from Table 2: CRC-015a, CRC-015b, CRC-015c, CRC-015d, CRC-015e, CRC-015f, CRC-015g, and CRC-015h.

Preferably, a CRC-015 compound is formulated using a water-soluble solubilizer and a human serum protein. To this end, the compound is dissolved in EtOH and a physiological saline solution containing the human serum protein is added.

The invention claimed is:

1. An implant, consisting of:
   a degradable main body defining a lumen, wherein the main body consists of a magnesium degradable alloy;

a degradable coating comprising at least one degradable polymer, the degradable coating substantially completely enclosing the main body on its luminal and abluminal sides; and an antiproliferative active substance consisting only of the antiproliferative active substance itself applied upon the degradable coating only on the abluminal side of the main body, wherein the degradable coating contains no active substance and the antiproliferative active substance is not in mixture with the degradable coating, wherein the antiproliferative active substance is paclitaxel or an mTOR inhibitor, wherein the mTOR inhibitor is selected from one of the following sirolimus;
everolimus;
zotarolimus
temsirolimus;
biolimus A9
ridaforolimus; or
a compound according to formula I, wherein formula I is

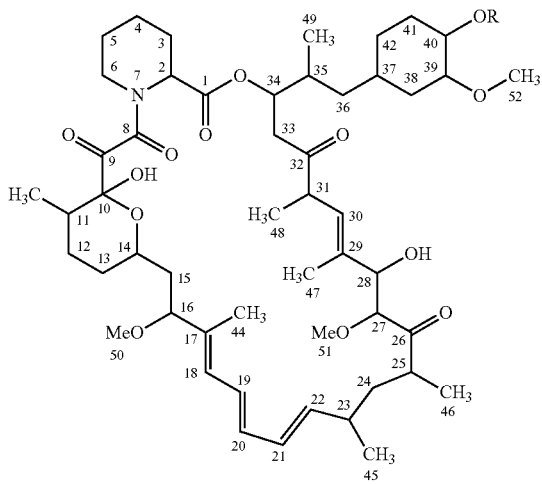

in which R is C(O)—(CH2)n-X, n is 0, 1 or 2, and X is a cyclic hydrocarbon having 3-9 carbon atoms, which optionally contains one or more unsaturated bonds.

2. The implant according to claim 1, wherein the degradable coating comprises polylactic acid and/or poly(lactide-co-glycolide), and/or poly-ε-caprolactone.

3. The implant according to claim 1, wherein the degradable coating comprises poly(L-lactic acid) having an inherent viscosity in the range from 0.5 dl/g to 4.0 dl/g.

4. The implant according to claim 1, wherein the main body has the form of a hollow cylindrical mesh.

5. The implant according to claim 1, wherein the implant is an endovascular implant.

6. The implant according to claim 1, wherein the degradable coating consists essentially of polylactic acid and/or poly(lactide-co-glycolide), and/or poly-ε-caprolactone.

7. The implant according to claim 1, wherein the antiproliferative active substance is paclitaxel.

8. The implant according to claim 1, wherein the degradable coating consists essentially of poly(L-lactic acid) having an inherent viscosity in the range from 0.5 dl/g to 4.0 dl/g.

9. The implant according to claim 1, wherein the implant is a stent.

10. The implant according to claim 1, wherein the degradable coating is a polymer matrix and the polymer matrix does not contain an active substance.

11. The implant according to claim 10, wherein the polymer matrix comprises one or more excipients that control its degradation behaviour.

12. The implant according to claim 1, wherein the degradable polymer comprises one or more degradation control excipients.

13. An implant, consisting of:
a magnesium degradable alloy main body defining a lumen;
at least one degradable polymer coating substantially completely enclosing the main body on its luminal and abluminal sides; and
an antiproliferative active substance consisting only of the antiproliferative active substance itself applied upon the degradable coating only on the abluminal side of the main body, wherein the degradable polymer contains no active substance and the antiproliferative active substance is not in mixture with the degradable polymer, wherein the antiproliferative active substance is an mTOR inhibitor.

14. The implant according to claim 13, wherein the degradable polymer comprises one or more degradation control excipients.

15. The implant according to claim 13, wherein the mTOR inhibitor is selected from the group consisting of:
sirolimus;
everolimus;
zotarolimus
temsirolimus;
biolimus A9
ridaforolimus; and
compound according to formula I:

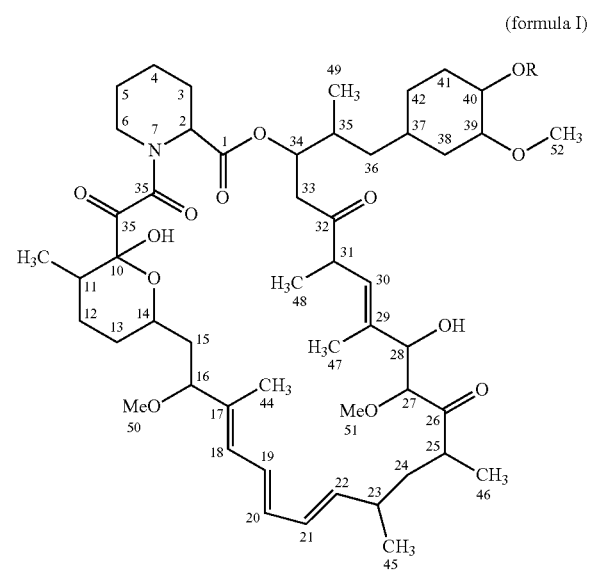

(formula I)

in which R is C(O)—(CH2)n-X, n is 0, 1 or 2, and X is a cyclic hydrocarbon having 3-9 carbon atoms.

16. A method for producing an implant, comprising the steps:
providing a degradable main body defining a lumen,
applying a degradable coating comprising at least one degradable polymer substantially to the entire surface of the degradable main body on its luminal and abluminal sides, applying an antiproliferative active substance to the degradable coating only on the abluminal side of the main body.

17. The method according to claim 16, wherein the degradable coating and/or the antiproliferative active substance is applied by spraying, atomizing, dip-coating or pipetting.

* * * * *